(12) United States Patent
Hoeppler et al.

(10) Patent No.: US 11,861,559 B2
(45) Date of Patent: Jan. 2, 2024

(54) METHOD AND DEVICE FOR PROVIDING A RESOURCE

(71) Applicant: Robert Bosch GmbH, Stuttgart (DE)

(72) Inventors: Christian Hoeppler, Backnang (DE); Daniel Kunz, Erdmannhausen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 309 days.

(21) Appl. No.: 17/306,619

(22) Filed: May 3, 2021

(65) Prior Publication Data
US 2021/0398075 A1    Dec. 23, 2021

(30) Foreign Application Priority Data
Jun. 19, 2020   (DE) .................. 102020207619.7

(51) Int. Cl.
| | | |
|---|---|---|
| G06Q 10/10 | (2023.01) | |
| G06Q 10/06 | (2023.01) | |
| G06Q 30/018 | (2023.01) | |
| G06Q 10/0631 | (2023.01) | |
| G06Q 20/08 | (2012.01) | |
| G06F 16/27 | (2019.01) | |
| H04L 9/32 | (2006.01) | |
| G06Q 20/38 | (2012.01) | |
| G06Q 50/18 | (2012.01) | |
| G06Q 50/30 | (2012.01) | |
| G06Q 50/06 | (2012.01) | |

(52) U.S. Cl.
CPC ............. *G06Q 10/10* (2013.01); *G06F 16/27* (2019.01); *G06Q 10/06315* (2013.01); *G06Q 20/085* (2013.01); *G06Q 30/018* (2013.01); *H04L 9/3247* (2013.01); *G06Q 20/389* (2013.01); *G06Q 50/06* (2013.01); *G06Q 50/18* (2013.01); *G06Q 50/30* (2013.01)

(58) Field of Classification Search
CPC ....... G06Q 10/10; G06Q 10/06; G06Q 20/145
USPC .......................................................... 705/7.25
See application file for complete search history.

(56) References Cited

U.S. PATENT DOCUMENTS

| | | | |
|---|---|---|---|
| 11,080,665 B1* | 8/2021 | Poelstra ................ H04L 9/3013 |
| 2010/0218108 A1* | 8/2010 | Crabtree ................ G06Q 50/06 |
| | | | 715/738 |
| 2012/0221473 A1* | 8/2012 | Redmann ................ G07F 5/26 |
| | | | 705/50 |
| 2013/0015809 A1* | 1/2013 | Frey ........................ B60L 53/30 |
| | | | 320/106 |
| 2017/0358041 A1* | 12/2017 | Forbes, Jr. ............. G05D 3/12 |
| 2018/0194241 A1* | 7/2018 | Hao ........................ G06F 21/44 |
| 2019/0353685 A1* | 11/2019 | Almeida Cavoto . G06Q 20/145 |

(Continued)

OTHER PUBLICATIONS https://iang.org/papers/intersection_ricardian_smart.html, Ian Grigg, "On the intersection of Ricardian and Smart Contracts", Feb. 2015.*

(Continued)

*Primary Examiner* — Nga B Nguyen
(74) *Attorney, Agent, or Firm* — NORTON ROSE FULBRIGHT US LLP; Gerard A. Messina

(57) ABSTRACT

A computer-implemented method for managing a provision of a resource. The method includes the following steps: receiving a request regarding a utilization of the resource, validating the request, and, based on the validation of the request, establishing a state channel.

20 Claims, 5 Drawing Sheets

(56) References Cited

U.S. PATENT DOCUMENTS

2019/0356164 A1* 11/2019 Ghaemi .............. G05B 13/048
2019/0393721 A1* 12/2019 Pignier ................. H02J 3/008
2020/0076198 A1* 3/2020 Beckmann ........... H04L 9/0637
2021/0221247 A1* 7/2021 Daniel .................... B60L 53/68

OTHER PUBLICATIONS

Dziembowski et al., "General State Channel Networks," ACM SIGSAC Conference on Computer and Communications Security (CCS '18), Association for Computing Machinery, 2018, pp. 949-966. DOI: <https://doi.org/10.1145/3243734.3243856>.

Dziembowski et al., "Perun: Virtual Payment Hubs Over Cryptocurrencies," IEEE Symposium on Security and Privacy (SP), 2019, pp. 1-19. <https://eprint.iacr.org/2017/635.pdf> Downloaded Apr. 29, 2021.

Grigg, "Ricardian Contract," IEEE International Workshop, 2004, pp. 1-13. <http://lang.org/papers/ricardian_contract.html> Downloaded Apr. 29, 2021.

Nakamoto, "Bitcoin: a Peer-to-Peer Electronic Cash System," Bitcoin Org., 2002, pp. 1-9. <https://bitcoin.org/bitcoin.pdf> Downloaded Apr. 29, 2021.

* cited by examiner

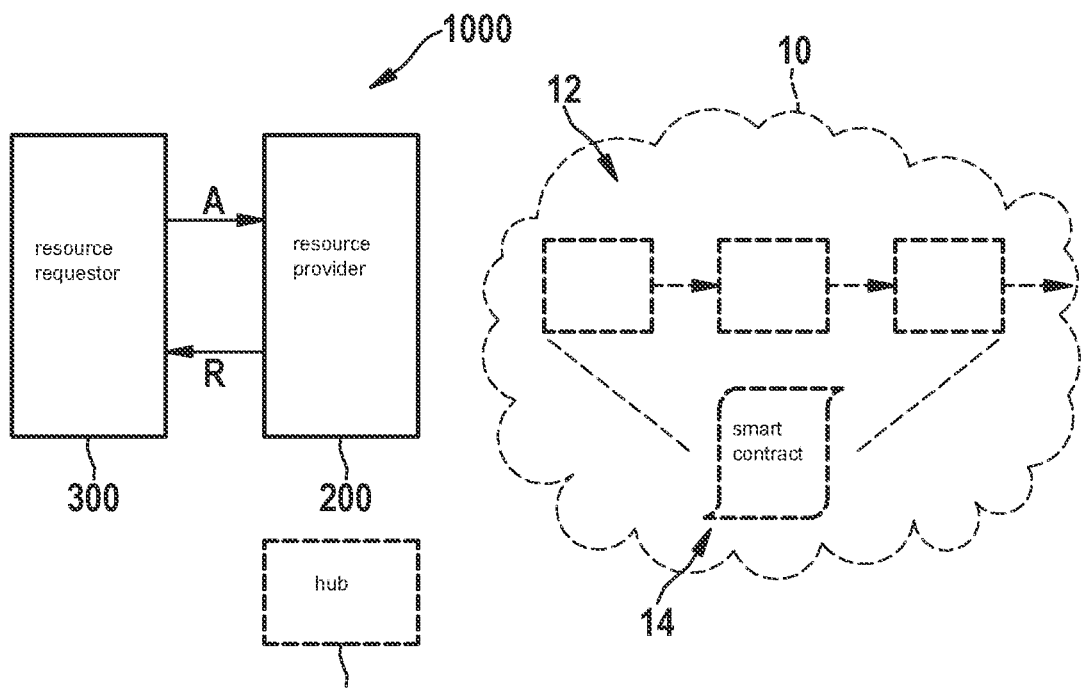
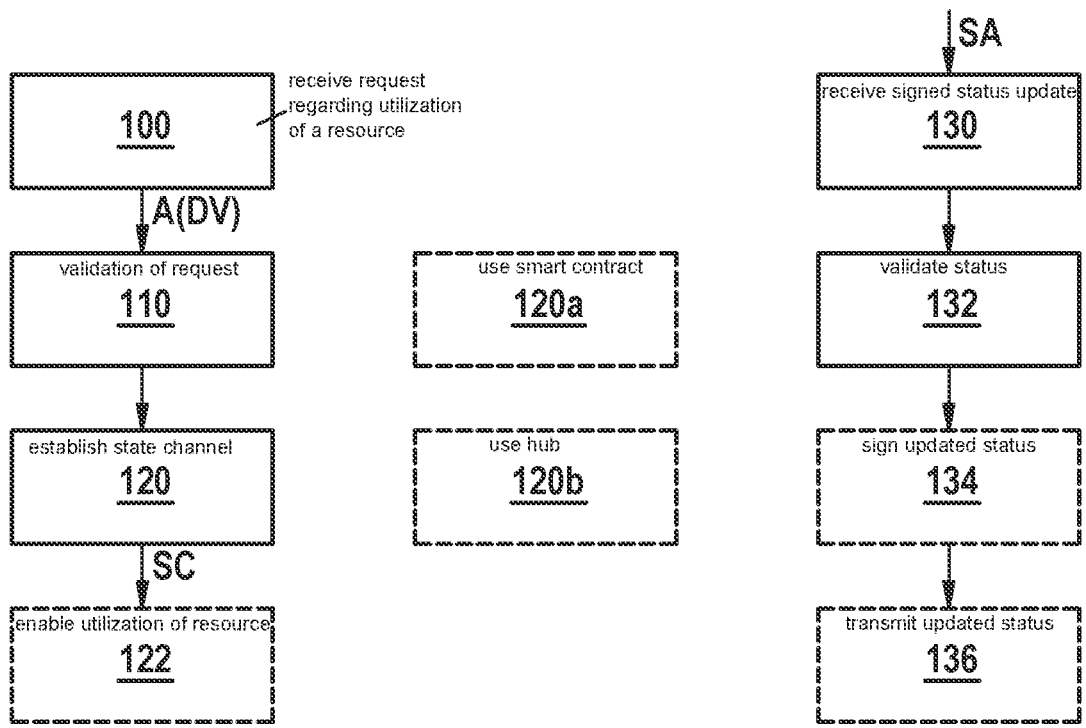
Fig. 2A    Fig. 2B    Fig. 2C

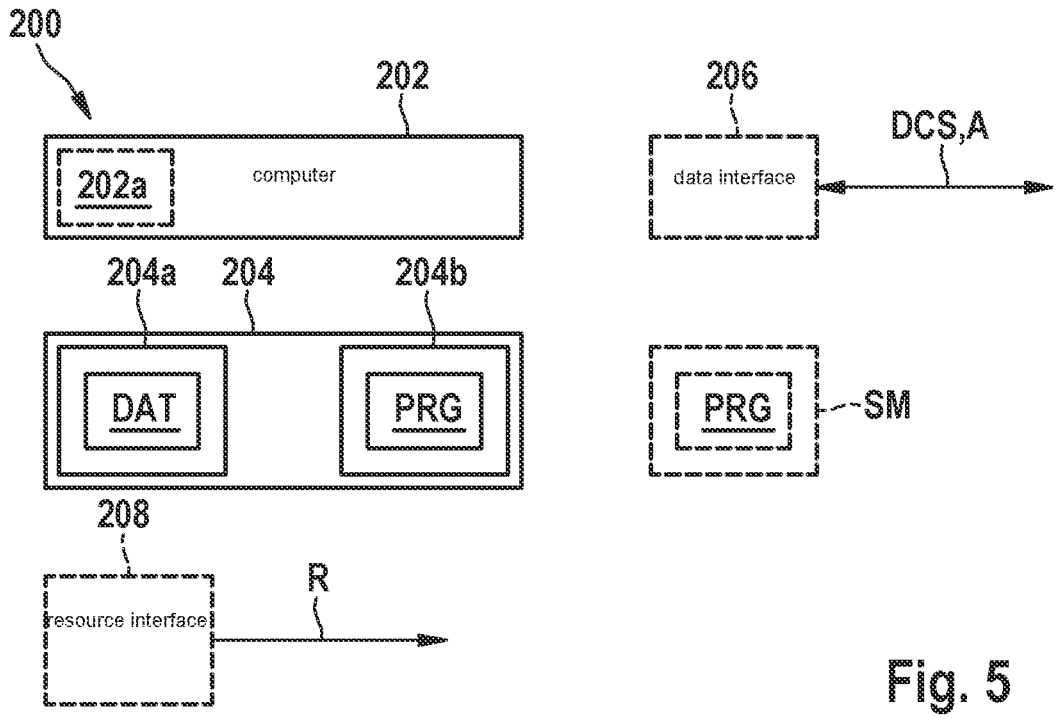
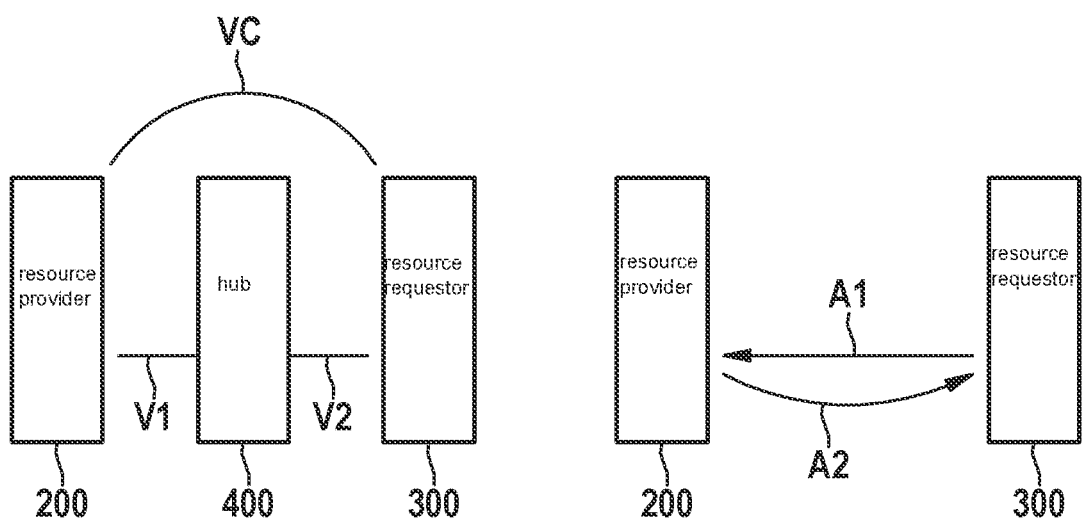
Fig. 5
Fig. 6A
Fig. 6B

METHOD AND DEVICE FOR PROVIDING A RESOURCE

CROSS REFERENCE

The present application claims the benefit under 35 U.S.C. § 119 of German Patent Application No. DE 102020207619.7 filed on Jun. 19, 2020, which is expressly incorporated herein by reference in its entirety.

FIELD

The present invention relates to an in particular computer-implemented method for managing a provision of a resource.

Moreover, the present invention relates to a device for managing a provision of a resource.

SUMMARY

Exemplary specific embodiments of the present invention relate to a method, in particular a computer-implemented method, for managing a provision of a resource, including the following steps: receiving a request regarding a utilization of the resource, validating the request, and, based on the validation of the request, establishing a state channel. In some exemplary specific embodiments, a decentralized utilization of resources is made possible in this way.

In further exemplary specific embodiments of the present invention, at least one state channel, for example as described in the documents cited below [Reference 2] may be used, for example, for receiving (and/or transmitting) the request, and/or for a further communication regarding the provision of the resource.

The following listed documents [Reference 1] and [Reference 2] are hereby expressly incorporated into the present description.

Stefan Dziembowski, Sebastian Faust, and Kristina Hostáková. 2018. General State Channel Networks. In Proceedings of the 2018 ACM SIGSAC Conference on Computer and Communications Security (CCS '18). Association for Computing Machinery, New York, NY, USA, 949-966. DOI: doi.org/10.1145/3243734.3243856 [Reference 1].

S. Dziembowski, L. Eckey, S. Faust, and D. Malinowski, "Perun: Virtual Payment Hubs over Cryptocurrencies," 2019 IEEE Symposium on Security and Privacy (SP), San Francisco, CA, USA, 2019, pp. 106-123, DOI: 10.1109/SP.2019.00020 [Reference 2].

In further exemplary specific embodiments of the present invention, for example signed transactions and/or pieces of status information and/or status updates may be transferred via the state channel, for example between a prospective consumer of a resource and a device that provides the resource, in particular a device according to exemplary specific embodiments.

In further exemplary specific embodiments of the present invention, a comparatively large number of (for example signed) transactions per unit of time may be transferred via the state channel, so that a request for and/or a provision of resources may accordingly take place dynamically.

In further exemplary specific embodiments of the present invention, it is provided that the request includes a digital contract, the digital contract containing at least one signature, the validation encompassing checking of the at least one signature.

In further exemplary specific embodiments of the present invention, the digital contract includes at least one of the following elements:
a) a digital signature of a first party, for example a prospective consumer of the resource,
b) a digital signature of a second party, for example a device that provides the resource,
c) a digital identity of the first party (for example, a decentralized identifier (DID) of the first party),
d) a digital identity of the second party (for example, a decentralized identifier (DID) of the second party),
e) terms of use, for example for a provision of the resource, f) a price per unit of the resource,
g) a piece of information characterizing the or a type of unit of the resource (for example, kilowatt-hour in the case of electrical energy as the resource),
h) a piece of information characterizing a currency or a type of currency (for example, information that a digital, for example blockchain-based, currency is used as currency),
i) an extent of the resource (for example, the number of units),
j) a time period for a utilization of the resource.

In further exemplary specific embodiments of the present invention, the digital contract is designed as a Ricardian contract, for example; cf. iang.org/papers/ricardian_contract.html.

In further exemplary specific embodiments of the present invention, as an alternative or in addition to the information characterizing the currency or the type of currency, a piece of information may also be contained in the digital contract that characterizes at least one of the following elements: assets or asset values, costs, money, cryptocurrency, promissory notes, vouchers, etc.

In further exemplary specific embodiments of the present invention, a state channel to be established or a type of state channel to be established may be ascertained based on the type of currency, for example.

In further exemplary specific embodiments of the present invention, the establishment of the state channel includes at least one of the following elements: a) use of a smart contract that is managed with the aid of a distributed ledger technology (DLT) system, for example, in particular for anchoring the state channel, b) use of a hub that is designed to receive the request from another unit, in particular a prospective consumer of the resource, and relay the request.

In further exemplary specific embodiments of the present invention, the state channel may be a so-called ledger channel, for example, that is implementable with the aid of a DLT system, for example.

In further exemplary specific embodiments of the present invention, the state channel may be implemented with the aid of a or the hub, for example.

In further exemplary specific embodiments of the present invention, it is provided that the DLT system includes at least one blockchain and/or at least one directed acyclic graph (DAG).

In further exemplary specific embodiments of the present invention, the blockchain may be understood as a concatenated list of data blocks that are linked to one another using cryptographic methods (for example, formation of a hash value of the particular data block), for example according to the Merkle tree principle. A tamper-proof storage of data in the blockchain is thus possible.

In further exemplary specific embodiments of the present invention, the blockchain may be implemented in the form of a distributed or decentralized database, multiple network elements ("nodes") of a blockchain network in each case storing data blocks of the blockchain. Fundamental aspects of the blockchain technology are described, for example, in the following publication: Nakamoto, Satoshi. (2009). "Bitcoin: A Peer-to-Peer Electronic Cash System," bitcoin.org/bitcoin.pdf.

In further preferred specific embodiments of the present invention, a DLT or the blockchain may store one or multiple smart contracts which, for example, allow the storage of pieces of information, for example also in conjunction with establishing the state channel according to exemplary specific embodiments, but also the execution of queries and other program functions, similarly to a programming language, for example based on pieces of information stored in the blockchain and/or regarding transactions carried out in the blockchain. In further exemplary specific embodiments, logic operations corresponding to contractual terms, and/or pieces of information characterizing a utilization of the resource, etc., may thus be stored in the blockchain with the aid of one or multiple smart contracts.

In further exemplary specific embodiments of the present invention, the hub may be designed, for example, to at least temporarily establish a preferably bidirectional data link with the device transmitting the request (for example, a prospective consumer of the resource) and/or with the device receiving the request, for example to transfer the request and/or to receive and/or relay pieces of information associated with the request, for example a confirmation or rejection, and/or a utilization of the pieces of information characterizing the resource, or the like.

In further exemplary specific embodiments of the present invention, an information exchange takes place via the hub according to further exemplary specific embodiments, at least predominantly outside an optional DLT system that may be present, for example "off-chain," i.e., without elements of the information exchange being stored via the hub, in particular simultaneously, in a blockchain (or a DAG) of the DLT system. In further exemplary specific embodiments, the information exchange via the hub may thus take place in a particularly efficient manner.

In further exemplary specific embodiments of the present invention, for example one of the configurations described in the following documents may be used as a hub: [Reference 1], [Reference 2].

In further exemplary specific embodiments of the present invention, the method further includes: enabling a utilization of the resource, for example by the prospective consumer. In other words, a device providing the resource may provide the resource, and the prospective consumer may utilize the resource after the stated enabling by the device providing the resource.

In further exemplary specific embodiments of the present invention, the method further includes: receiving at least one, for example signed, status update, in particular from a or the consumer, validating a status that is characterized, in particular updated, by the status update.

In further exemplary specific embodiments of the present invention, the status update, which may be signed by the consumer, for example, may characterize a request, for example a further request, for the resource. In other words, in further exemplary specific embodiments the consumer with the aid of the status update may request or demand a further and/or renewed utilization of the resource.

In further exemplary specific embodiments of the present invention, the validation of the status that is characterized, in particular updated, by the status update may include, for example: checking whether the status corresponds to the agreed conditions characterized by the digital contract, for example.

In further exemplary specific embodiments of the present invention, the method further includes: signing the in particular updated status, transmitting the in particular updated status, in particular to the consumer. In further exemplary specific embodiments, the device providing the resource signs the updated status before transmitting it to the consumer.

In further exemplary specific embodiments of the present invention, the method further includes: ascertaining whether conditions for a utilization of the resource are, in particular still, present, and optionally in particular when the conditions for the utilization of the resource are no longer present, ending a possible utilization of the resource and optionally closing the state channel.

Further exemplary specific embodiments of the present invention relate to a device for managing the provision of a resource, the device being designed to carry out the method according to the specific embodiments.

In further preferred specific embodiments of the present invention, it is provided that the device includes: a computer that includes at least one processor core, a memory device associated with the computer for at least temporarily storing at least one of the following elements: a) data, b) a computer program, in particular for carrying out the method according to the specific embodiments.

In further preferred specific embodiments of the present invention, the data may include at least temporarily and/or partially received requests and/or status updates and/or rules for the provision, for example derivable from the digital contract.

In further preferred specific embodiments of the present invention, the memory device includes a volatile memory (a working memory (RAM), for example) and/or a nonvolatile memory (a flash EEPROM, for example).

In further preferred specific embodiments of the present invention, the computer may include at least one of the following elements: microprocessor (μP), microcontroller (μC), application-specific integrated circuit (ASIC), system on a chip (SoC), programmable logic module (field programmable gate array (FPGA), for example), hardware circuit, graphics processing unit (GPU), or arbitrary combinations of same.

Further exemplary specific embodiments of the present invention relate to a method for requesting a resource, including the following steps: transmitting a request regarding a utilization of the resource, in particular to a device according to the specific embodiments, and, optionally, establishing a or the state channel, and, optionally, receiving the resource.

In further exemplary specific embodiments of the present invention, the method further includes: transmitting a status update, for example to request a renewed utilization of the resource, and, optionally, further receiving of the resource, in particular based on the status update.

Further exemplary specific embodiments of the present invention relate to a device for requesting a resource, the device being designed to carry out the method according to the specific embodiments.

Further exemplary specific embodiments of the present invention relate to a system for providing at least one resource, including at least one device for providing the at least one resource according to the specific embodiments, and at least one device for requesting a resource according to the specific embodiments.

In further exemplary specific embodiments of the present invention, it is provided that the system also includes at least one hub that is designed to receive the request and relay it to the device for providing the resource.

Further preferred specific embodiments of the present invention relate to a computer-readable memory medium, including commands which, when executed by a computer, prompt the computer to carry out the method according to the specific embodiments.

Further preferred specific embodiments of the present invention relate to a computer program, including commands which, when the program is executed by a computer, prompt the computer to carry out the method according to the specific embodiments.

Further preferred specific embodiments of the present invention relate to a data carrier signal that characterizes and/or transfers the computer program according to the specific embodiments. The data carrier signal is receivable, for example, via an optional data interface of the device.

Further preferred specific embodiments of the present invention relate to a use of the method according to the specific embodiments and/or of the device according to the specific embodiments and/or of the system according to the specific embodiments and/or of the computer-readable memory medium according to the specific embodiments and/or of the computer program according to the specific embodiments and/or of the data carrier signal according to the specific embodiments for at least one of the following elements: a) providing at least one resource, b) managing the provision of the at least one resource, c) transferring the request via a state channel, d) allowing an in particular fine-grained payment, in particular at least essentially in real time, for a provision of at least one resource, e) establishing and/or discontinuing and/or utilizing a state channel, in particular utilizing the state channel for payment of an in particular requested resource, f) shared use of a vehicle, in particular a motor vehicle, for example car sharing, g) providing electrical energy, in particular for charging at least one device for at least temporarily storing an electrical charge which in particular is capable of work, h) using a tool, for example a hand-held power tool, for example in the form of a sharing economy principle, i) utilizing an interface, for example a programming interface (API).

Further features, application options, and advantages of the present invention result from the following description of exemplary embodiments of the present invention, illustrated in the figures of the drawing. All described or illustrated features, alone or in any arbitrary combination, constitute the subject matter of the present invention, regardless of their wording or illustration in the description or the figures, respectively.

BRIEF DESCRIPTION OF THE DRAWINGS

FIG. 1 schematically shows a simplified block diagram according to exemplary specific embodiments of the present invention.

FIG. 2A schematically shows a simplified flowchart of a method according to further exemplary specific embodiments of the present invention.

FIG. 2B schematically shows a simplified flowchart of a method according to further exemplary specific embodiments of the present invention.

FIG. 2C schematically shows a simplified flowchart of a method according to further exemplary specific embodiments of the present invention.

FIG. 5 schematically shows a simplified block diagram according to further exemplary specific embodiments of the present invention.

FIG. 6A schematically shows a simplified block diagram according to further exemplary specific embodiments of the present invention.

FIG. 6B schematically shows a simplified block diagram according to further exemplary specific embodiments of the present invention.

DETAILED DESCRIPTION OF EXAMPLE EMBODIMENTS

Figure 2D:
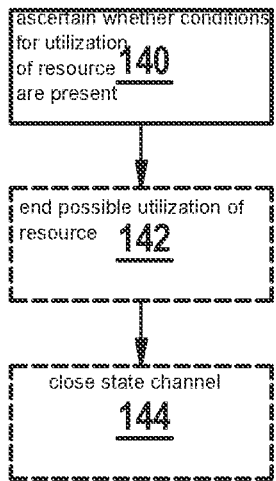
FIG. 2D schematically shows a simplified flowchart of a method according to further exemplary specific embodiments of the present invention.

FIG. 1 schematically shows a simplified block diagram according to exemplary specific embodiments, a device 200 for providing a resource R, for example electrical energy, being provided. Further exemplary specific embodiments (cf. FIG. 2A) relate to a method, in particular a computer-implemented method, for managing a provision of resource R.

In further exemplary specific embodiments, the method may, for example, be at least temporarily carried out by device 200 (FIG. 1), and includes the following steps (cf. FIG. 2A): receiving 100 a request A regarding a utilization of resource R, validating 110 request A, and, based on validation 110 of request A, establishing 120 a state channel SC. In some exemplary specific embodiments, a decentralized utilization of resources or of resource R is thus made possible.

In further exemplary specific embodiments, at least one state channel, for example as described in [Reference 2] cited below, may be used, for example, for receiving 110 (and/or transmitting, for example by device 300; see details below) request A, and/or for a further communication regarding the provision of resource R.

The following listed documents [Reference 1] and [Reference 2] are hereby expressly incorporated into the present description.

Stefan Dziembowski, Sebastian Faust, and Kristina Hostáková. 2018. General State Channel Networks. In Proceedings of the 2018 ACM SIGSAC Conference on Computer and Communications Security (CCS '18). Association for Computing Machinery, New York, NY, USA, 949-966. DOI: doi.org/10.1145/3243734.3243856 [Reference 1].

S. Dziembowski, L. Eckey, S. Faust, and D. Malinowski, "Perun: Virtual Payment Hubs over Cryptocurrencies," 2019 IEEE Symposium on Security and Privacy (SP), San Francisco, CA, USA, 2019, pp. 106-123, DOI: 10.1109/SP.2019.00020 [Reference 2].

In further exemplary specific embodiments, for example (digitally) signed transactions and/or pieces of status information and/or status updates may be transferred via state channel SC, for example between a prospective consumer 300 (FIG. 1) of a resource and a device 200 that provides resource R, in particular a device 200 according to exemplary specific embodiments.

In further exemplary specific embodiments, reference numeral 300 denotes a device for requesting resources R. In further exemplary specific embodiments, device 300 may be associated with a consumer of the resource, for example. In this regard, reference numeral 300 by way of example is used for device 300 and also for a consumer (in the sense of a natural person, for example) possibly associated with device 300.

In further exemplary specific embodiments, a comparatively large number of (for example signed) transactions per unit of time may be transferred via the state channel, so that a request for and/or a provision of resources may accordingly take place dynamically.

In further exemplary specific embodiments, it is provided that request A includes or characterizes a digital contract DV (cf. also FIG. 4), digital contract DV containing at least one signature SIG-1, validation 110 (FIG. 2A) encompassing checking of the at least one signature SIG-1. In this way it may be determined, for example, whether a manipulation of digital contract DV has taken place.

In further exemplary specific embodiments, digital contract DV includes at least one of the following elements:
  a) a digital signature SIG-1 of a first party, for example of a or the prospective consumer 300 (FIG. 1) of the resource,
  b) a digital signature SIG-2 of a second party, for example a device 200 providing the resource,
  c) a digital identity ID-1 of the first party (for example, a decentralized identifier (DID) of the first party),
  d) a digital identity ID-2 of the second party (for example, a decentralized identifier (DID) of the second party),
  e) terms of use NB, for example for a provision of resource R,
  f) a price per unit PPE of resource R,
  g) a piece of information T-E characterizing the or a type of unit of the resource (for example, kilowatt-hour in the case of electrical energy as resource R),
  h) a piece of information T-W characterizing a currency or a type of currency (for example, information that a digital, for example blockchain-based, currency is used as currency),
  i) an extent RES-U of the resource (for example, the number of units),
  j) a time period T-NUTZ for a utilization of the resource.

In further exemplary specific embodiments, digital contract DV is designed as a Ricardian contract, for example; cf. iang.org/papers/ricardian_contract.html.

In further exemplary specific embodiments, a state channel SC to be established or a type of state channel SC to be established may be ascertained, for example, based on the type of currency T-W of digital contract DV.

In further exemplary specific embodiments, the utilization of an optional self-sovereign identity (SSI) system may be provided which is designed, for example, for storing cryptographic keys K-1, K-2 of parties 200, 300.

In further exemplary specific embodiments, establishment 120 (FIG. 2A) of the state channel includes at least one of the following elements (cf. FIG. 2B): a) use 120a of a smart contract 14 (FIG. 1) that is managed with the aid of an optional distributed ledger technology (DLT) system 10, for example, in particular for anchoring state channel SC, b) use 120b of a hub 400 (FIG. 1) that is designed to receive request A from another unit 300, in particular a prospective consumer 300 of resource R, and relay the request.

In further exemplary specific embodiments, it is provided that optional DLT system 10 (FIG. 1) includes at least one blockchain 12 and/or at least one directed acyclic graph (DAG), not shown.

In further exemplary specific embodiments, blockchain 12 may be understood as a concatenated list of data blocks that are linked to one another using cryptographic methods (for example, formation of a hash value of the particular data block), for example according to the Merkle tree principle. A tamper-proof storage of data in blockchain 12 is thus possible.

In further exemplary specific embodiments, blockchain 12 may be implemented in the form of a distributed or decentralized database, multiple network elements ("nodes") of a blockchain network in each case storing data blocks of blockchain 12. Fundamental aspects of the blockchain technology are described, for example, in the following publication: Nakamoto, Satoshi. (2009). Bitcoin: A Peer-to-Peer Electronic Cash System, bitcoin.org/bitcoin.pdf.

In further preferred specific embodiments, a DLT or blockchain 12 may store one or multiple smart contracts 14 which, for example, allow the storage of pieces of information, for example also in conjunction with establishing 110 (FIG. 2A) state channel SC according to exemplary specific embodiments, but also executing queries and other program functions, similarly to a programming language, for example based on pieces of information stored in blockchain 12 and/or regarding transactions carried out in blockchain 12. In further exemplary specific embodiments, logic operations corresponding to contractual terms, and/or pieces of information characterizing a utilization of resource R, may thus be stored in blockchain 12 with the aid of one or multiple smart contracts 14.

In further exemplary specific embodiments, state channel SC may be a so-called ledger channel, for example, that is implementable with the aid of DLT system 10, for example.

In further exemplary specific embodiments, state channel SC may be implemented with the aid of a or the hub 400, for example.

In further exemplary specific embodiments, hub 400 may be designed, for example, to at least temporarily establish a preferably bidirectional data link with device 300 transmitting request A and/or with device 200 receiving request A, for example to transfer request A and/or to receive and/or relay pieces of information associated with request A, for example a confirmation or rejection, and/or a utilization of pieces of information characterizing resource R, or the like.

In further exemplary specific embodiments, an information exchange takes place via the hub according to further exemplary specific embodiments, at least predominantly outside an optional DLT system 10 that may be present, for example "off-chain," i.e., without elements of the information exchange being stored via hub 400, in particular simultaneously, in a blockchain 12 (or a DAG) of DLT system 40. In further exemplary specific embodiments, the information exchange via hub 400 may thus take place in a particularly efficient manner.

In further exemplary specific embodiments, for example one of the configurations described in the following documents may be used as a hub: [Reference 1], [Reference 2].

In further exemplary specific embodiments, the method further includes (cf. FIG. 2A): enabling 122 a utilization of resource R, for example by the prospective consumer. In other words, a device 200 (FIG. 1) providing resource R may provide resource R, and prospective consumer 300 may utilize resource R after stated enabling 122 by device 200 that provides resource R.

In further exemplary specific embodiments (cf. FIG. 2C), the method further includes: receiving 130 at least one, for example signed, status update SA, in particular from a or the consumer 300, validating 132 a status that is characterized, in particular updated, by status update SA.

In further exemplary specific embodiments, status update SA, which may be signed by consumer 300, for example, may characterize a request, for example a further request, for resource R. In other words, in further exemplary specific embodiments, consumer 300 with the aid of status update SA may request or demand a further and/or renewed utilization of resource R.

Figure 4:
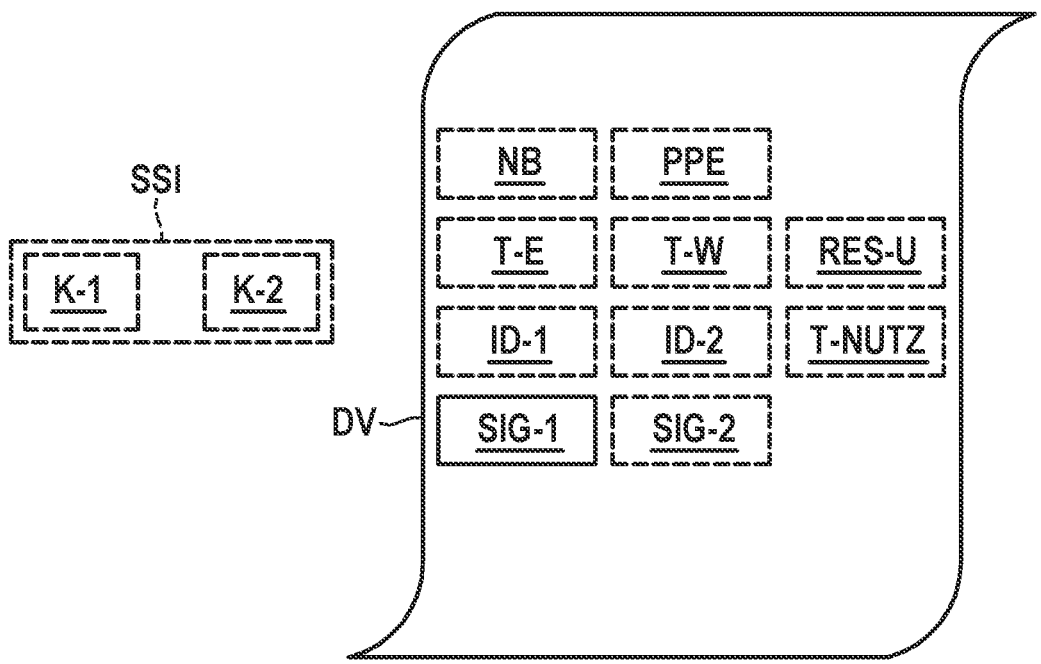
FIG. 4 schematically shows a simplified block diagram according to further exemplary specific embodiments of the present invention.

In further exemplary specific embodiments, validation 132 of the status that is characterized, in particular updated, by status update SA may include, for example: checking whether the status corresponds to the agreed conditions characterized by digital contract DV, for example (FIG. 4).

In further exemplary specific embodiments, the method further includes (cf. FIG. 2C): signing 134 the in particular updated status, transmitting 136 the updated status, in particular to consumer 300. In further exemplary specific embodiments, device 200 providing the resource thus signs the updated status before transmitting it to consumer 300.

In further exemplary specific embodiments, the method further includes (cf. FIG. 2D): ascertaining 140 whether conditions for a utilization of resource R are, in particular still, present, and optionally in particular when the conditions for the utilization of resource R are no longer present, ending 142 a possible utilization of resource R and optionally closing 144 state channel SC.

Further exemplary specific embodiments relate to a device 200 (FIG. 1) for managing the provision of a resource R, device 200 being designed to carry out the method according to the specific embodiments.

In further preferred specific embodiments (cf. FIG. 5), it is provided that device 200 includes: a computer 202 that includes at least one processor core 202a, a memory device 204 associated with computer 202 for at least temporarily storing at least one of the following elements: a) data DAT, b) a computer program PRG, in particular for carrying out the method according to the specific embodiments.

In further preferred specific embodiments, data DAT may include, at least temporarily and/or partially, received requests A and/or status updates SA and/or rules for the provision, for example derivable from digital contract DV (FIG. 4).

In further preferred specific embodiments, the memory device includes a volatile memory 204a (a working memory (RAM), for example) and/or a nonvolatile memory 204b (a flash EEPROM, for example).

In further preferred specific embodiments, computer 202 may include at least one of the following elements: microprocessor (μP), microcontroller (μC), application-specific integrated circuit (ASIC), system on a chip (SoC), programmable logic module (field programmable gate array (FPGA), for example), hardware circuit, graphics processing unit (GPU), or arbitrary combinations of same.

Further preferred specific embodiments relate to a computer-readable memory medium SM, including commands PRG which, when executed by a computer 202, prompt the computer to carry out the method according to the specific embodiments.

Further preferred specific embodiments relate to a computer program PRG, including commands which, when the program is executed by a computer 202, prompt the computer to carry out the method according to the specific embodiments.

Further preferred specific embodiments relate to a data carrier signal DCS that characterizes and/or transfers computer program PRG according to the specific embodiments. Data carrier signal DCS is receivable, for example, via an optional data interface 206 of device 200, via which in further exemplary specific embodiments request A, for example, and/or other pieces of information that are transferrable or are to be transferred via state channel SC, for example, is/are also receivable.

In further preferred specific embodiments, device 200 includes an optional resource interface 208 for providing resource(s) R. In the case of electrical energy as a resource, resource interface 208 may be designed, for example, to provide an electrical charge that is capable of work.

Further exemplary specific embodiments (cf. FIG. 3A) relate to a method for requesting a resource R, including the following steps: transmitting 150 a request A regarding a utilization of resource R, in particular to a device 200 according to the specific embodiments, and, optionally, establishing 152 a or the state channel SC, and, optionally, receiving 154 resource R.

In further exemplary specific embodiments (cf. FIG. 3B), the method further includes: transmitting 156 a status update SA to device 200, in particular via state channel SC, for example to request a renewed utilization of resource R, and optionally further receiving 158 of the resource, in particular based on status update SA.

Figure 3A:
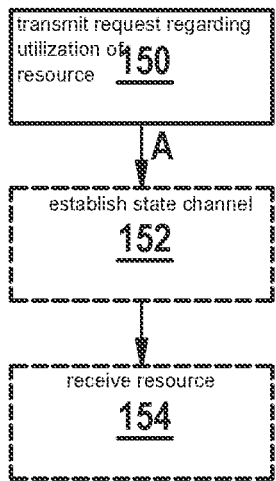
FIG. 3A schematically shows a simplified flowchart of a method according to further exemplary specific embodiments of the present invention.
Figure 3B:
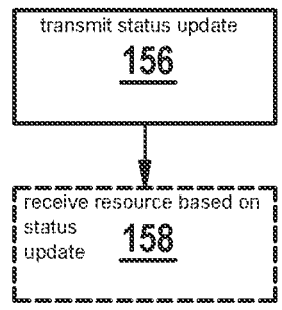
FIG. 3B schematically shows a simplified flowchart of a method according to further exemplary specific embodiments of the present invention.

Further exemplary specific embodiments relate to a device 300 (FIG. 1) for requesting a resource R, device 300 being designed to carry out the method according to the specific embodiments (for example, according to FIGS. 3A, 3B).

In further exemplary specific embodiments, device 300 may have a configuration that is comparable to configuration 200 according to FIG. 5.

Further exemplary specific embodiments relate to a system 1000 (FIG. 1) for providing at least one resource R, including at least one device 200 for providing the at least one resource R according to the specific embodiments, and at least one device 300 for requesting a resource R according to the specific embodiments.

In further exemplary specific embodiments, it is provided that system 1000 also includes at least one hub 400 that is designed to receive request A and relay it to device 200 for providing resource R or to implement state channel SC.

FIG. 6A shows by way of example a configuration in which a state channel SC (FIG. 2A), for example also a virtual state channel VC within the meaning of [Reference 1] (cf. FIG. 4 therein, "Virtual state channel creation," for example), is established between device 200 that provides the resource and prospective consumer 300. In further preferred specific embodiments, an establishment of virtual state channel VC may take place using hub 400, for example, devices 200, 300, for example, each accommodating a connection V1, V2 to hub 400, and the establishment of virtual state channel VC then being initiated.

In further exemplary specific embodiments, an exchange of pieces of information and/or resources may be understood as a type of "flow" (cf. FIG. 6B), on one side, for example, money or pieces of information characterizing a corresponding value flowing in the direction of device 200 that provides the resource (cf. arrow A1 from FIG. 6B), for example within the scope of microtransactions, and on the other side, the requested or agreed resource, for example electrical energy, flowing from providing device 200 in the direction of consumer 300 (cf. arrow A2), for example in each case after enabling for utilization of the resource, for example at defined time intervals.

Figure 7:
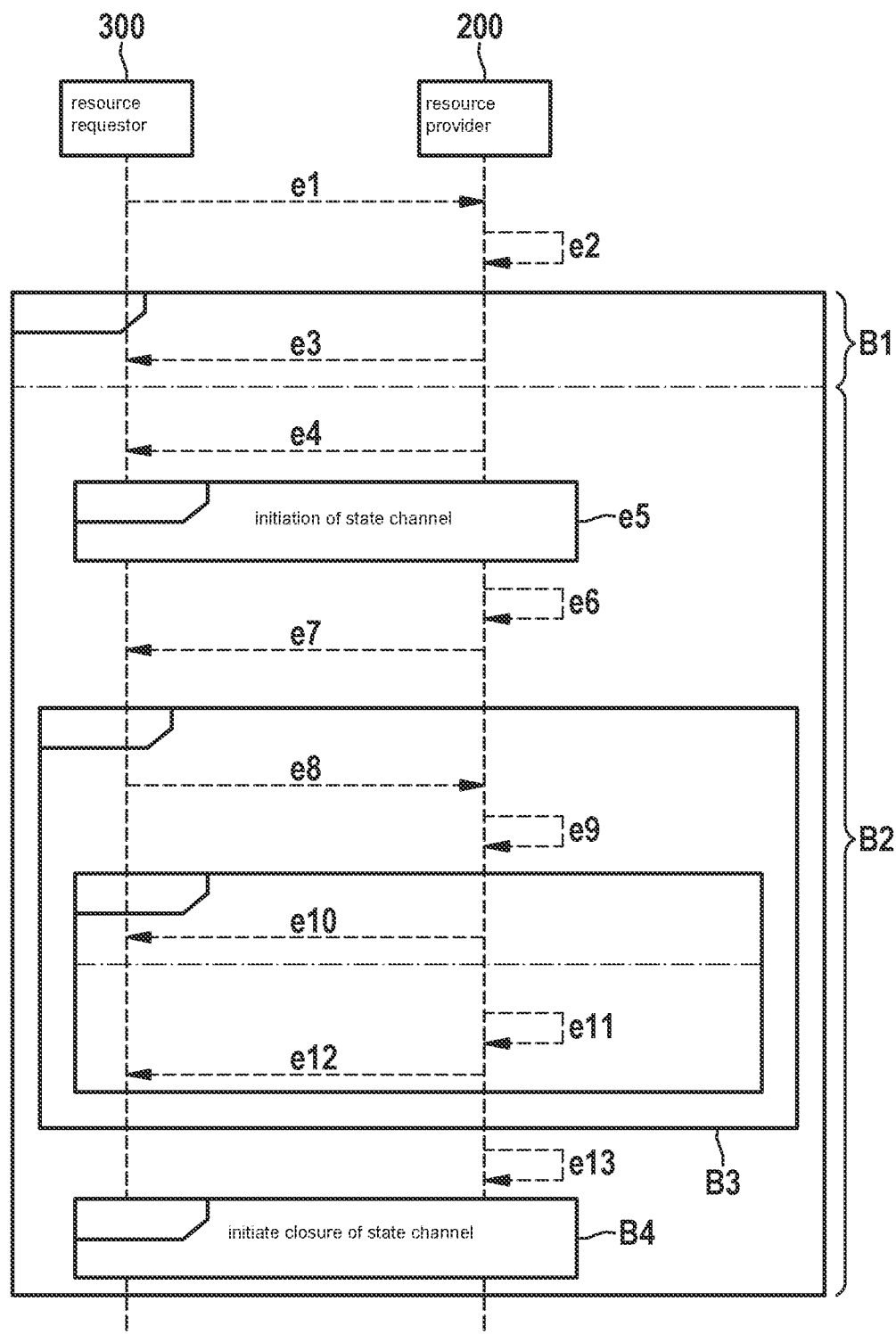
FIG. 7 schematically shows a simplified flowchart according to further exemplary specific embodiments of the present invention.

FIG. 7 schematically shows a simplified flowchart according to further exemplary specific embodiments. Element e1 symbolizes the transmission of a digital contract DV (FIG. 4), designed as a Ricardian contract, for example, from consumer 300 to device 200 that provides resource R. With transmission e1 of digital contract DV, according to further exemplary specific embodiments, consumer 300 thus requests the utilization of resource R.

Element e2 symbolizes a validation of at least one digital signature SIG-1 that is associated with digital contract DV and/or contained therein, for example based on a decentralized identifier (DID), for example to ensure that the at least one signature SIG-1 has not been manipulated.

Element e3 from block B1 symbolizes a failed validation. In this case, the operation may be aborted, for example, and for example no state channel SC or virtual state channel VC is established, and for example requested resource R is not provided.

Otherwise, i.e., if validation e2 was successful, the method skips to block B2, for example a (virtual) state channel being established (cf. element e4). For example, device 200 may transmit a prompt or request e4 to consumer 300 in order to establish the (virtual) state channel or prompt consumer 300 to establish the (virtual) state channel or cooperate in establishing the (virtual) state channel. Funding that is usable in further exemplary specific embodiments and/or a system or protocol, for example a state channel protocol, that is used for establishing the (virtual) state channel may be ascertained based on digital contract DV, for example.

Element e5 symbolizes the initiation of (virtual) state channel SC, VC, for example incorporating consumer 300 (cf. also reference numerals V1, V2, VC according to FIG. 6A, for example).

After successful initiation of the (virtual) state channel, consumer 300 obtains access to requested resource R, element e6 from FIG. 7 symbolizing, for example, the enabling of resource R. In further preferred specific embodiments, resource R may be provided, for example, via a corresponding optional interface 208 (FIG. 5) of device 200 itself (and received, for example, via a corresponding or complementary resource interface (not shown) of device 200). In further preferred specific embodiments, device 200 may signal enabling e6 of resource R of also some other unit, for example (not shown), that is designed to provide resource R.

Element e7 from FIG. 7 symbolizes a state in which the access to requested resource R by consumer 300 is possible.

In block B3 consumer 300 transmits, for example with its key K-1 (FIG. 4), digitally signed status updates e8, for example to device 200 that provides resource R at agreed time periods or points in time, for example with the aid of digital contract DV, for example to demand a renewed utilization.

Device 200 validates the updated status (cf. element e9), and if this updated status corresponds to the agreed conditions, device 200 updates the utilization (cf. element e11) and signs the status itself and transmits the status, which it has now also signed, together with the agreed utilization to consumer 300 (cf. element e12). Otherwise, i.e., if validation e9 was not successful, the operation is aborted (cf. element e10).

If the conditions for the further utilization are no longer present, either due to the expenditure of the agreed means of payment or the expiration of a time period, device 200 ends the possible utilization (cf. element e13 according to FIG. 7), and for example completes a defined end routine (cf. also the example of the sequence according to FIG. 2D).

In further exemplary specific embodiments (cf. element e13), one of the parties (consumer 300/device 200) initiates the closure of the (virtual) state channel (cf. block B4).

Figure 8:
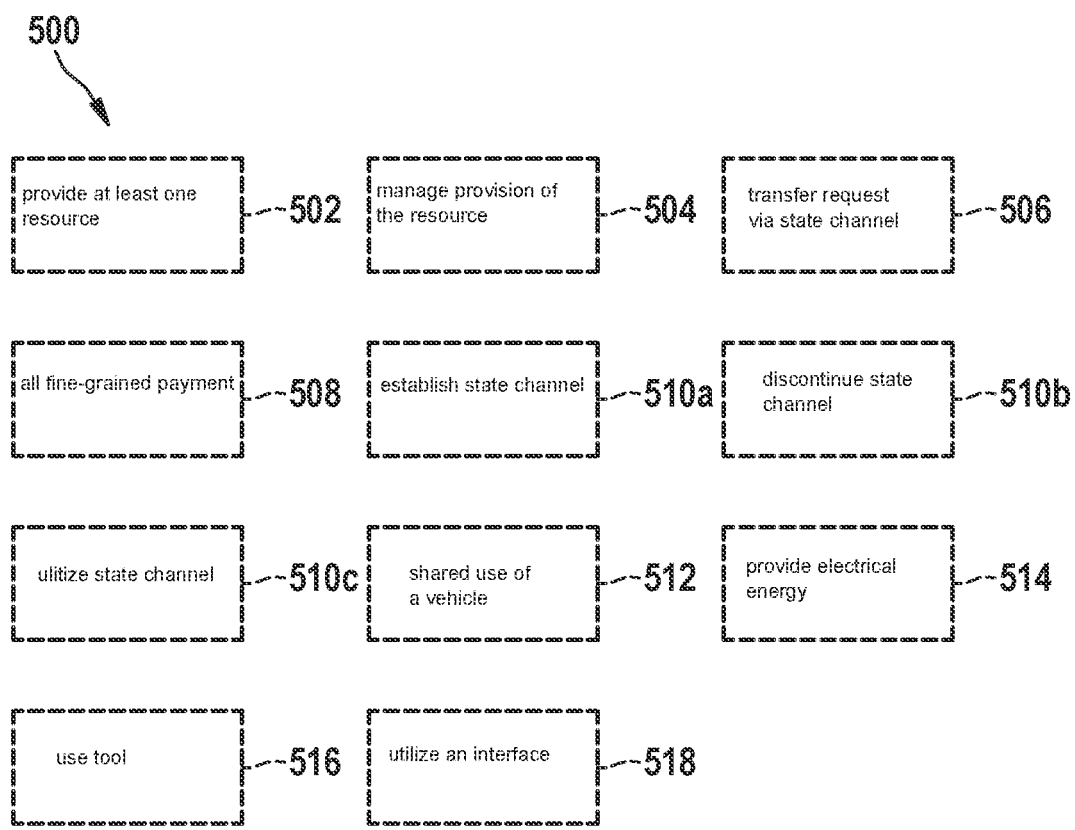
FIG. 8 schematically shows a simplified block diagram according to further exemplary specific embodiments of the present invention.

Further exemplary specific embodiments (cf. FIG. 8) relate to a use 500 of the method according to the specific embodiments and/or of device 200, 300 according to the specific embodiments and/or of system 1000 according to the specific embodiments and/or of computer-readable memory medium SM according to the specific embodiments and/or of computer program PRG according to the specific embodiments and/or of data carrier signal DCS according to the specific embodiments for at least one of the following elements: a) providing 502 at least one resource R, b) managing 504 the provision of the at least one resource, c) transferring 506 request A via a state channel SC, d) allowing 508 an in particular fine-grained payment, in particular at least essentially in real time, for a provision of at least one resource R, e) establishing 510a and/or discontinuing 510b and/or utilizing 510c a state channel SC, in particular utilizing state channel SC for payment of an in particular requested resource R, f) shared use 512 of a vehicle, in particular a motor vehicle, for example car sharing, g) providing 514 electrical energy, in particular for charging at least one device for at least temporarily storing an electrical charge which in particular is capable of work, h) using 516 a tool, for example a hand-held power tool, for example in the form of a sharing economy principle, i) utilizing 518 an interface, for example a programming interface (API).

Further exemplary specific embodiments relate to the application of a car sharing principle, using the principle according to the exemplary specific embodiments described above: a user agrees with a car sharing provider for the use of an automobile under negotiated conditions, for example directly or via a marketplace. The conditions, such as price/minute and/or DID of the user and of the provider, possibly a specific automobile DID if agreed to, and/or a linking to general terms and conditions (AGB), and/or a DLT system 10, and/or currency such as a payment token and an ID/time stamp, are contained in a Ricardian contract DV, for example (FIG. 4) and signed by both parties, for example. The signature is created, for example, with reference to the agreed conditions, for example so that they are not alterable.

The user or consumer with whom, for example, device 300 according to the specific embodiments is associated now locates the automobile and sends to it on-site via a data link (for example, directly, in a wireless or wired manner, via a cloud, or in some other way) Ricardian contract DV (cf. also element e1 according to FIG. 7). The automobile with which, for example, device 200 according to the specific embodiments is associated validates Ricardian contract DV (cf. also element e2 according to FIG. 7). Upon successful validation, user or device 300 obtains response e4 (FIG. 7) for initiating a state channel SC. The protocol for initialization e5 (FIG. 7) defined by way of example is executed by both parties 200, 300, for example. After successful initiation e5, the automobile (or device 200 associated with it) enables access by the user (or device 300 associated with the user) and unlocks itself (cf. element e6). The user (or device 300 associated with the user) now transfers, for example once per minute, a new status e8 containing, for example, a transfer of the agreed costs from the user account to the agreed account of device 200 or a party associated with device 200 (for example, the provider of the car sharing automobile). The new status is signed by both parties 200, 300. In return, the automobile (or device 200 associated with it) allows the use for an additional minute, for example. As soon as the destination (the end of the trip, for example) is reached, a defined shutdown routine by way of example is executed, and both parties 200, 300 have the option, for example, to close state channel SC. In the case of a prior usage of the money deposited upon opening the state channel, the automobile (or device 200 associated with it) executes a defined exit routine, for example stopping at the next opportunity and blocking further travel.

Further exemplary specific embodiments relate to the application of a principle for charging an electrical consumer and/or store (a battery, for example (not shown)) with electrical energy, using the principle according to the exemplary specific embodiments described above: a user (with whom device 300 and a battery, for example, are associated) agrees with a charging station provider or operator (with whom device 200, for example, is associated) for the use of a charging station under negotiated conditions, for example directly or via a marketplace. The conditions, such as price/kWh, DIDs of the user and of the provider, possibly a specific charging station DID if agreed to, linking to AGB, a DLT system, currency such as a payment token and an ID/time stamp, are contained in a Ricardian contract DV, for example (FIG. 4), and digitally signed by both parties 200, 300, for example. The digital signature is created, for example, with reference to the agreed conditions, for example so that they are not alterable. User 300 now locates charging station 200 and sends to it on-site Ricardian contract DV via a link (for example, directly, in a wireless or wired manner, via a cloud, or in some other way). Charging station 200 validates Ricardian contract DV. Upon successful validation, user 300 obtains response e4 (FIG. 7) for initiating the state channel. The protocol for initializing state channel SC is executed by both parties 200, 300, for example. After successful initiation, charging station 200 enables access to user 300 and unlocks itself. The user now transfers a new status, for example once per minute, containing a transfer of the agreed costs from the user account to the agreed account of charging station 200 or its operator. The new status is signed by both parties. In return, charging station 200 transfers a further amount of electrical energy to user 300. As soon as the battery is fully charged, for example, a shutdown routine is executed which allows both parties 200, 300 to close state channel SC. In the case of a prior usage of the money deposited upon opening the state channel, the charging station for example executes a defined exit routine, for example the abortion of the charging operation.

Further exemplary specific embodiments relate to the application of a sharing economy principle for temporarily using a power tool, for example, such as a drill, using the principle according to the exemplary specific embodiments described above, for example the operation, described above by way of example with reference to FIG. 7, being usable at least in part: a user (with whom device 300, for example, is associated) agrees with a tool provider (with whom, or with the tools of whom, for example device 200 is associated) for the use of a tool, for example a drill, under negotiated conditions, for example directly or via a marketplace. The conditions, such as price/minute and/or DIDs of the user and of the provider, possibly a specific machine DID if agreed to, a linking to AGB, a DLT system, currency such as a payment token and an ID/time stamp, are contained in a Ricardian contract DV, for example, and signed by both parties. The signature is created, for example, with reference to the agreed conditions, so that they are not alterable. The user now locates the tool and sends to it on-site via a link (for example, directly, via cloud, etc. Ricardian contract DV. The tool validates this contract. Upon successful validation (cf. element e2 from FIG. 7, for example), the user obtains the response for initiating state channel SC (cf. element e4 from FIG. 7, for example). The protocol for the initialization is executed by both parties. After successful initiation, the tool enables access by the user and unlocks itself (cf. element e6 from FIG. 7, for example). The user now transfers a new status, for example once per minute (cf. element e8 from FIG. 7, for example), containing a transfer of the agreed costs from the user account to the agreed account of the tool provider via state channel SC. This new status is signed by both parties. In return, the tool allows the use for an additional minute (cf. element e12 from FIG. 7, for example). When the target is reached, a shutdown routine is executed, and both parties 200, 300 have the option, for example, to close state channel SC. In the case of a prior usage of the blocked money, the tool or the provider executes an exit routine, for example blocking further use, with the aid of device 200.

Further exemplary specific embodiments relate to a utilization of a programming interface (API), using the principle according to the exemplary specific embodiments described above, for example the operation, described above by way of example with reference to FIG. 7, being usable at least in part: a user (with whom device 300, for example, is associated) agrees with an API provider to use a defined API (weather data, for example) under negotiated conditions, for example directly or via a marketplace. The conditions, such as price/data set, DIDs of the user and of the provider, possibly specific API identifiers (for example, uniform resource identifier (URI)) if agreed to, and/or linking to AGB, DLT system 10, currency such as a payment token and an ID/time stamp, are contained in a Ricardian contract DV, for example (FIG. 4) and signed by both parties 200, 300, for example. The signature is created, for example, with reference to the agreed conditions, for example so that they are not alterable. The user now sends Ricardian contract DV to the API in order to apply for use of the API (cf. element e1 from FIG. 7, for example). The API provider or device 200 associated with same validates the contract (cf. element e2 from FIG. 7, for example). Upon successful validation, the user obtains the response for initiating state channel SC. The protocol for the initialization is executed by both parties. After successful initiation, the API service enables access by the user and unlocks itself. Upon each request e8 (FIG. 7) for a data set, the user now transfers a new status containing a transfer of the agreed costs from the user account to the agreed account of the resource. This new status is signed by both parties. In return, API service 200 allows a further data set (cf. element e12). When the target is reached, a defined shutdown routine is executed, and both parties have the option, for example, to close state channel SC. In the case of a prior usage of the blocked money, the API service executes a defined exit routine, for example blocking further access by the user.

Further exemplary specific embodiments allow the creation of a decentralized principle which, for example, allows a fine-grained payment for the utilization of a resource R, for example using microtransactions. In addition, in further exemplary specific embodiments this payment may be completed comparatively quickly, for example essentially in real time, which, for example, also increases the trust between two unknown entities (for example, users of devices 200, 300).

Due to the decentralized mechanism, in further exemplary specific embodiments it is ensured that no centralized party can collect data by itself, for example with regard to carrying out an economic transaction. In addition, the number of transactions is reduced to an optional third party system (DLT system 10, for example), thus making an important contribution to scalability.

In further exemplary specific embodiments, smart contracts or digital contracts DV, for example between mutually distrustful parties acting rationally on an individual basis, may optionally enter into and optionally enforce reliable and fair contracts, for example with the aid of distributed ledger technology (DLT). In further exemplary specific embodiments, the smart contract defines the contractual content as program code, while optional DLT system 10 provides a decentralized platform which reliably executes this program code correctly and verifiably, and which may thus be regarded as a "decentralized notary service."

In further exemplary specific embodiments, it is possible with the aid of at least one state channel SC to execute smart contracts or digital contracts without communication with a ledger and still maintain the assured properties. As soon as a state channel is created in further exemplary specific embodiments, smart contracts or digital contracts DV may be efficiently entered into (ideally in real time) and executed between the establishing parties. In further exemplary specific embodiments, the interlinking of multiple state channels to form a network of state channels may also allow a so-called off-chain execution of the contracts, also across multiple state channels, so that in further exemplary specific embodiments, the contracting parties do not necessarily have to open their own state channel.

If in further exemplary specific embodiments, parties are connected via a network of state channels without, for example, being directly connected themselves via a state channel ("base channel"), in further exemplary specific embodiments they have the option, for example, to create a virtual state channel in real time, in particular without communicating with the ledger.

What is claimed is:

1. A computer-implemented method for managing a provision of a resource, the method comprising the following steps:
   receiving, by a resource provider of the resource, a request from a resource consumer regarding a utilization of the resource, the request being relayed from the resource consumer to the resource provider by a hub which at least temporarily establishes a data link between the resource provider and the resource consumer;
   validating the request; and
   based on the validation of the request, establishing a state channel between the resource provider and the resource consumer, wherein the state channel is a channel anchored by a distributed ledger technology system which includes at least one blockchain, wherein via the state channel, the resource provider and the resource consumer perform off-chain transactions without interaction with the at least one blockchain;
   receiving, by the resource provider from the resource consumer via the state channel, a payment to the resource provider for the resource; and
   enabling, by the resource provider, utilization of the resource by the resource consumer;
   wherein the resource provider is a device including a computer and a memory which manages the provision of the resource.

2. The method as recited in claim 1, wherein the request includes a digital contract, the digital contract containing at least one signature, the validation encompassing checking of the at least one signature.

3. The method as recited in claim 2, wherein the digital contract includes a Ricardian contract.

4. The method as recited in claim 1, wherein the establishment of the state channel includes use of a smart contract that is managed with the aid of the distributed ledger technology for anchoring the state channel.

5. The method as recited in claim 1, further comprising:
   receiving at least one status update via the state channel from the resource consumer; and
   validating a status that is updated by the status update.

6. The method as recited in claim 5, wherein the status update is signed.

7. The method as recited in claim 5, further comprising:
   signing the updated status; and
   transmitting the updated status to the resource consumer.

8. The method as recited in claim 1, further comprising:
   ascertaining whether conditions for a utilization of the resource are present.

9. The method as recited in claim 8, further comprising:
   ending a possible utilization of the resource; and
   closing the state channel.

10. A device for managing provision of a resource, the device being a resource provider of the resource and being configured to:
    receive a request, from a resource consumer, regarding a utilization of the resource, the request being relayed from the resource consumer to the resource provider by a hub which at least temporarily establishes a data link between the resource provider and the resource consumer;
    validate the request; and
    based on the validation of the request, establish a state channel between the resource provider and the resource consumer, wherein the state channel is a channel anchored by a distributed ledger technology system which includes at least one blockchain, wherein via the state channel, the resource provider and the resource consumer perform off-chain transactions without interaction with the at least one blockchain;
    receive, by the resource provider from the resource consumer via the state channel, a payment to the resource provider for the resource; and
    enable, by the resource provider, utilization of the resource by the resource consumer;
    wherein the resource provider is a device including a computer and a memory which manages the provision of the resource.

11. A method for requesting a resource by a resource consumer, comprising:
    transmitting, by the resource consumer, a request regarding a utilization of the resource to a device, the device being a resource provider of the resource and being configured to receive a request regarding a utilization of the resource, the request being relayed from the resource consumer to the resource provider by a hub which at least temporarily establishes a data link between the resource provider and the resource consumer, validate the request, and based on the validation of the request, establish a state channel between the resource provider and the resource consumer, wherein the state channel is a channel anchored by a distributed ledger technology system which includes at least one blockchain, wherein via the state channel, the resource provider and the resource consumer perform off-chain transactions without interaction with the at least one blockchain;

transmitting, by the resource consumer via the state channel, a payment to the resource provider for the resource; and utilizing, by the resource consumer, the resource, the utilization of the resource being enabled by the resource provider;

wherein the resource provider is a device including a computer and a memory which manages the provision of the resource.

12. The method as recited in claim 11, further comprising:
transmitting, by the resource consumer, a status update via the state channel; and receiving, by the resource consumer, the resource based on the status update.

13. A device for requesting a resource, the device being a resource consumer and being configured to:

transmit a request regarding a utilization of the resource to a device, the device being a resource provider of the resource and being configured to receive a request regarding a utilization of the resource, the request being relayed from the resource consumer to the resource provider by a hub which at least temporarily establishes a data link between the resource provider and the resource consumer, validate the request, and based on the validation of the request, establish a state channel between the resource provider and the resource consumer, wherein the state channel is a channel anchored by a distributed ledger technology system which includes at least one blockchain, wherein via the state channel, the resource provider and the resource consumer perform off-chain transactions without interaction with the at least one blockchain;

transmit, by the resource consumer via the state channel, a payment to the resource provider for the resource; and utilize, by the resource consumer, the resource, the utilization of the resource being enabled by the resource provider;

wherein the resource provider is a device including a computer and a memory which manages the provision of the resource.

14. A system for providing at least one resource to a resource consumer by a resource provider, comprising:

at least one device including a computer and memory which manages provision of a resource, the device being a resource provider of the resource and being configured to:
receive a request from the resource consumer regarding a utilization of the resource, the request being relayed from the resource consumer to the resource provider by a hub which at least temporarily establishes a data link between the resource provider and the resource consumer,
validate the request,
based on the validation of the request, establishing a state channel between the resource consumer and the resource provider, wherein the state channel is a channel anchored by a distributed ledger technology system which includes at least one blockchain, wherein via the state channel, the resource provider and the resource consumer perform off-chain transactions without interaction with the at least one blockchain,
enable utilization of the resource by the resource consumer; and at least one device for requesting a resource, the device for requesting being the resource consumer and being configured to:
transmit the request regarding a utilization of the resource to the resource provider, and
transmit a payment for the resource to the resource provider via the state channel, and
utilize, by the resource consumer, the resource, the utilization of the resource being enabled by the resource provider.

15. A non-transitory computer-readable memory medium on which are stored commands for managing a provision of a resource, the commands, when executed by a computer, causing the computer to perform the following steps:

receiving, by a resource provider of the resource, a request from a resource consumer regarding a utilization of the resource, the request being relayed from the resource consumer to the resource provider by a hub which at least temporarily establishes a data link between the resource provider and the resource consumer;

validating the request; and based on the validation of the request, establishing a state channel between the resource provider and the resource consumer, wherein the state channel is a channel anchored by a distributed ledger technology system which includes at least one blockchain, wherein via the state channel, the resource provider and the resource consumer perform off-chain transactions without interaction with the at least one blockchain;

receiving, by the resource provider from the resource consumer via the state channel, a payment to the resource provider for the resource; and enabling, by the resource provider, utilization of the resource by the resource consumer;

wherein the resource provider is a device including a computer and a memory which manages the provision of the resource.

16. A non-transitory computer-readable memory medium on which are stored commands for requesting a resource by resource consumer, the stored commands, when executed by a computer, causing the computer to perform:

transmitting, by the resource consumer, a request regarding a utilization of the resource to a device, the device being a resource provider of the resource and being configured to receive a request regarding a utilization of the resource, the request being relayed from the resource consumer to the resource provider by a hub which at least temporarily establishes a data link between the resource provider and the resource consumer, validate the request, and based on the validation of the request, establish a state channel between the resource provider and the resource consumer, wherein the state channel is a channel anchored by a distributed ledger technology system which includes at least one blockchain, wherein via the state channel, the resource provider and the resource consumer perform off-chain transactions without interaction with the at least one blockchain;

transmitting, by the resource consumer via the state channel, a payment to the resource provider for the resource; and utilizing, by the resource consumer, the resource, the utilization of the resource being enabled by the resource provider wherein the resource provider is a device including a computer and a memory which manages the provision of the resource.

17. The method as recited in claim 1, wherein the method is used for at least one of the following: a) providing the resource, b) managing the provision of the resource, c) transferring the request via the state channel, d) allowing a fine-grained payment in real time for the provision of the resource, e) establishing and/or discontinuing and/or utilizing the state channel for payment of the resource, f) shared use of a motor vehicle, g) providing electrical energy for charging at least one device for at least temporarily storing an electrical charge which is capable of work, h) using a hand-held power tool, i) utilizing an interface for a programming interface.

18. The method as recited in claim 1, further comprising:
transmitting via the state channel by the resource consumer a request to the resource provider for a renewed utilization of the resource.

19. The method as recited in claim 1, wherein the resource provider is a charging station, and wherein the resource provider enables utilization of the resource by enabling a charging with electrical energy of a battery of the resource consumer.

20. The device as recited in claim 10, wherein the resource provider is a charging station, and wherein the resource provider enables utilization of the resource by enabling a charging with electrical energy of a battery of the resource consumer.

* * * * *